(12) United States Patent
Oikawa et al.

(10) Patent No.: US 9,365,914 B2
(45) Date of Patent: Jun. 14, 2016

(54) DUPLEX STAINLESS STEEL SUPERIOR IN CORROSION RESISTANCE OF WELD

(75) Inventors: Yusuke Oikawa, Tokyo (JP); Shinji Tsuge, Tokyo (JP); Hiroshige Inoue, Tokyo (JP); Ryo Matsuhashi, Tokyo (JP)

(73) Assignee: NIPPON STEEL & SUMIKIN STAINLESS STEEL CORPORATION, Tokyo (JP)

( * ) Notice: Subject to any disclaimer, the term of this patent is extended or adjusted under 35 U.S.C. 154(b) by 334 days.

(21) Appl. No.: 14/004,039

(22) PCT Filed: Mar. 9, 2012

(86) PCT No.: PCT/JP2012/056154
§ 371 (c)(1),
(2), (4) Date: Sep. 9, 2013

(87) PCT Pub. No.: WO2012/121380
PCT Pub. Date: Sep. 13, 2012

(65) Prior Publication Data
US 2013/0343948 A1    Dec. 26, 2013

(30) Foreign Application Priority Data

Mar. 9, 2011 (JP) .................. 2011-051071
Feb. 15, 2012 (JP) .................. 2012-030142

(51) Int. Cl.
*C22C 38/42* (2006.01)
*C22C 38/44* (2006.01)
(Continued)

(52) U.S. Cl.
CPC ........... *C22C 38/005* (2013.01); *B23K 35/0261* (2013.01); *B23K 35/308* (2013.01); *B23K 35/3053* (2013.01); *C21D 6/004* (2013.01); *C21D 8/0226* (2013.01); *C21D 8/0263* (2013.01); *C22C 38/001* (2013.01); *C22C 38/002* (2013.01); *C22C 38/004* (2013.01); *C22C 38/008* (2013.01); *C22C 38/02* (2013.01); *C22C 38/06* (2013.01); *C22C 38/42* (2013.01); *C22C 38/44* (2013.01); *C22C 38/46* (2013.01);
(Continued)

(58) Field of Classification Search
None
See application file for complete search history.

(56) References Cited

U.S. PATENT DOCUMENTS 4,657,606 A    4/1987    Guha
4,798,635 A    1/1989    Bernhardsson et al.
(Continued)

FOREIGN PATENT DOCUMENTS

EP    0107489    5/1984
EP    0455625    11/1991
(Continued)

OTHER PUBLICATIONS

European Supplemental Search Report dated Mar. 17, 2015 issued in corresponding EP Application No. EP12754869.
International Search Report dated Jun. 5, 2012 issued in corresponding PCT Application No. PCT/JP2012/056154.

*Primary Examiner* — Deborah Yee
(74) *Attorney, Agent, or Firm* — Kenyon & Kenyon LLP

(57) ABSTRACT

A nitrogen-rich two-phase stainless steel that has corrosion resistance equal to that of standard type of two-phase stainless steel and is not susceptible to corrosion in a welding heat-affected part, wherein the austenite phase area ratio is 40-70%, the PI value expressed by formula (1) is 30-38, the NI value expressed by formula (2) is 100-140, and the γpre expressed by formula (3) is 1350-1450. (1) PI=Cr+3.3Mo+16N (2) NI=(Cr+Mo)/N.

6 Claims, 1 Drawing Sheet

(51) Int. Cl.
*C22C 38/46* (2006.01)
*C22C 38/48* (2006.01)
*C22C 38/58* (2006.01)
*C22C 38/00* (2006.01)
*C21D 6/00* (2006.01)
*C22C 38/02* (2006.01)
*C22C 38/06* (2006.01)
*C22C 38/50* (2006.01)
*C22C 38/52* (2006.01)
*C22C 38/54* (2006.01)
*C21D 8/02* (2006.01)
*B23K 35/30* (2006.01)
*B23K 35/02* (2006.01)

(52) U.S. Cl.
CPC ............... *C22C 38/48* (2013.01); *C22C 38/50* (2013.01); *C22C 38/52* (2013.01); *C22C 38/54* (2013.01); *C22C 38/58* (2013.01); *C21D 2211/001* (2013.01); *C21D 2211/005* (2013.01)

(56) References Cited

U.S. PATENT DOCUMENTS

| 4,985,091 | A | * | 1/1991 | Culling | C22C 38/42 148/325 |
| 5,672,215 | A |   | 9/1997 | Azuma et al. | |
| 5,672,315 | A |   | 9/1997 | Okato | |
| 2011/0250088 | A1 | * | 10/2011 | Samuelsson | C21D 8/02 420/40 |

FOREIGN PATENT DOCUMENTS

| EP | 0534864 | 3/1993 |
| JP | 61-56267 | 3/1986 |
| JP | 2002-241838 | 8/2002 |
| JP | 2006-183129 | 7/2006 |
| JP | 2006-241590 | 9/2006 |
| JP | 2010084220 | 4/2010 |
| WO | 96/18751 | 6/1996 |
| WO | 02/27056 | 4/2002 |
| WO | 2009/044135 | 4/2009 |
| WO | 2009/119895 | 10/2009 |
| WO | 2010/070202 | 6/2010 |

\* cited by examiner

DUPLEX STAINLESS STEEL SUPERIOR IN CORROSION RESISTANCE OF WELD

This application is a national stage application of International Application No. PCT/JP2012/056154, filed Mar. 9, 2012, which claims priority to Japanese Application Nos. 2011-051071, filed Mar. 9, 2011, and 2012-030142, filed Feb. 2, 2012, the contents of which are incorporated by reference in their entirety.

TECHNICAL FIELD

The present invention relates to a lean duplex stainless steel which is a duplex stainless steel having 2 phases of an austenite phase and a ferrite phase, whose content of expensive alloys, such as Ni and Mo, has been restrained, and is able to suppress a decrease in corrosion resistance of a weld heat-affected zone, which is a major problem to be solved, thereby improving the welding performance, which may constitute a bottleneck for the steel to be applied to a welded structure.

BACKGROUND ART

A duplex stainless steel has both an austenite phase and a ferrite phase in its structure of steel, and has been heretofore used as a high strength and high corrosion resistance material for a petrochemical plant material, a pump material, a chemical tank material, etc. Further, since duplex stainless steel is generally a low Ni component system, reflecting recent price inflation of metal source materials, it has drawn keen attention as a material having a lower alloy cost with less cost fluctuation than an austenite stainless steel which has been a mainstream stainless steel.

There are hot topics concerning a duplex stainless steel, namely development of a lean-type steel and an increase in demand of the same.

A lean-type steel is a steel grade, in which the content of expensive alloys is restrained compared to a conventional duplex stainless steel so as to reinforce further the advantages of low alloy cost. Examples thereof include those described in Patent Literature 1 and 2, which are standardized according to ASTM-A240, and the former corresponds to S32304 (representative components 23 Cr—4 Ni—0.17 N), and the latter to S32101 (representative components 22 Cr—1.5 Ni—5 Mn—0.22 N).

Conventional main steel grades, JIS-SUS329J3L, SUS329J4L, etc., are further corrosion-resistant than SUS316L, which is an austenite type highly corrosion-resistant steel, are added with expensive Ni and Mo in an amount of approx. 6 to 7% and approx. 3 to 4% respectively (hereinafter % with respect to a component means mass-%).

Compared with this, a lean duplex stainless steel compromises on the corrosion resistance level close to SUS316L or a standard type of steel of SUS304, but in exchange decreases greatly the contents of Mo to almost 0, and Ni to approx. 4% in the case of S32304 and approx. 1% in the case of S32101.

Further, a steel grade having decreased Ni and Mo, while maintaining corrosion resistance close to JIS-SUS329J3L, has been recently developed, and described in Patent Literature 3 and standardized as S82441 according to ASTM-A240. More precisely, referring to SUS329J3L cost reduction is attempted while securing the corrosion resistance by reducing Mo from approx. 3 to approx. 1.6, and Ni from approx. 6 to approx. 3.6, and in exchange increasing Cr from approx. 23 to approx. 24, Mn from approx. 1.5 to approx. 3, and N from approx. 0.15 to approx. 0.27.

Patent Literature 4 describes an improved grade of S32304 in Patent Literature 1, in which Cu is added to improve the corrosion resistance in an acidic environment and any of Nb, V and Ti is added in order to increase the strength. Further, Patent Literature 5 prescribes a lean duplex steel component system as an austenite-ferrite stainless steel superior in ductility and deep drawability, into which V is added at 0.5% or less as an optional element, which is allegedly an element for effectuating an increase in strength by means of micronizing the structure of steel.

A problem to be solved with respect to a lean duplex steel is decrease in corrosion resistance of a weld heat-affected zone. In a lean-type duplex stainless steel N is generally added in a large amount instead of Ni and Mo. In the case of such a high N duplex steel, if the material should have received in carrying out welding a heat input beyond a limit in a heat-affected zone (so-called HAZ) near the weld, extreme decrease in corrosion resistance may take place.

Consequently, a high N duplex steel is utilized in a limited way despite its low alloy cost in an application where corrosion resistance and toughness are less important, or as a structural material for welding with a low heat input, namely with a lowered welding speed.

To overcome the problem the inventors have disclosed in Patent Literature 6 a lean duplex stainless steel superior in corrosion resistance of a weld heat-affected zone and toughness, characterized in that the steel contains C: 0.06% or less, Si: 0.1 to 1.5%, Mn: 2.0 to 4.0%, P: 0.05% or less, S: 0.005% or less, Cr: 19.0 to 23.0%, Ni: 1.00 to 4.0%, Mo: 1.0% or less, Cu: 0.1 to 3.0%, V: 0.05 to 0.5%, Al: 0.003 to 0.050%, O: 0.007% or less, N: 0.10 to 0.25%, and Ti: 0.05% or less, wherein the balance is Fe and unavoidable impurities, and that the Md30 value is 80 or less, Ni-bal. is from −8 to −4, the upper limit of the N content is expressed by a relational expression with the Ni-bal., the austenite area ratio is from 40 to 70%, and 2×Ni+Cu is 3.5 or more. The key point of the invention is suppression of nitride precipitation in a HAZ by addition of a trace of V at a solid solution level, as well as by defining the upper limit of N in accordance with the Ni-bal. which is an austenite amount estimation formula.

CITATION LIST

Patent Literature

[Patent Literature 1] Japanese Laid-open Patent Publication No. S61-56267
[Patent Literature 2] WO2002/27056
[Patent Literature 3] WO2010/70202
[Patent Literature 4] WO96/18751
[Patent Literature 5] Japanese Laid-open Patent Publication No. 2006-183129
[Patent Literature 6] WO2009/119895
[Patent Literature 7] Japanese Laid-open Patent Publication No. 2006-241590

SUMMARY OF INVENTION

Technical Problem

An object of the present invention is to provide a lean duplex stainless steel, for which a problem to be posed by use in a structural material, etc., is mitigated by curbing the alloy cost to the extent possible and suppressing the afore-described decrease in corrosion resistance in a HAZ based on the technical findings obtained for a lean type duplex stainless steel described in Patent Literature 6, and modifying the technical findings for application to a higher corrosion resistance duplex stainless steel at the level of SUS329J3L described in Patent Literature 3.

Solution to Problem

The present inventors studied precisely a method for suppressing the decrease in corrosion resistance in a HAZ to the extent possible to obtain findings about an occurrence mechanism of the phenomenon and suppressing measures thereon, thereby completing the present invention. Although the occurrence mechanism is the same as in Patent Literature 6, the suppressing measures were different due to an increase in Cr and Mo. The reason behind the decrease in corrosion resistance in a weld HAZ is as follows.

The N added to the duplex stainless steel almost completely forms a solid solution in the austenite phase, and the amount of a solid solution in the ferrite phase is extremely small. By heating in welding the proportion of a ferrite phase is increased and that of an austenite phase is decreased; and the amount of solid solution N in the solid ferrite phase is increased; but during cooling after welding, due to a fast cooling rate, the amount of an austenite phase does not return to the level before welding, and the proportion of solid solution N in the ferrite phase remains at a higher level compared to that before welding. Meanwhile, the solid solubility limit of N in a ferrite phase is relatively small and the portion exceeding the solid solubility limit precipitates out forming Cr nitride during cooling. By the nitride precipitation, Cr is consumed to form a so-called chromium depletion zone, which deteriorates the corrosion resistance. This is the reason of the decrease in corrosion resistance in a weld HAZ.

Next, with respect to suppressing measures on the decrease in corrosion resistance, as a general method for decreasing amounts of solid solution C and N in ferrite, alloying of a stabilizing element for a carbonitride, such as Ti and Nb, is widely known, and as a ferrite stainless steel, a high purity ferrite stainless steel, in which the C and N contents are decreased to an extremely low level and approx. 0.1 to 0.6% of Ti and Nb are added, has been put to practical use.

On the other hand, if such an amount of Ti or Nb is alloyed in a lean duplex stainless steel containing a large amount of N, a large amount of the N precipitates out as a nitride to compromise the toughness.

Therefore, the present inventors took into consideration the action of elements having affinity with N, such as V, Nb, and B, and investigated and studied the relationship between their contents and the corrosion resistance in a weld HAZ and toughness of a lean duplex stainless steel to acquire newly the following findings.

In a lean duplex stainless steel, the respective elements of V, Nb, B, etc. are different in terms of the magnitude of affinity with N and the temperature where respective nitrides are formed in accordance with kinds and amounts of the elements. An element with very strong affinity, such as Ti and Zr, precipitates a nitride at a relatively high temperature around a solidifying point, and B with relatively strong affinity does at a temperature near a hot rolling temperature or a solution heat-treatment temperature, to cause toughness decrease. However, with respect to V or Nb, solid solution/precipitation can be controlled by adjusting its content in a temperature range of 900 to 600° C. where a nitride of Cr is formed.

Therefore, the present inventors studied further an improving method based on addition of V. Although there is a precedent of addition of V into a duplex stainless steel as described in past literature, commonly performed addition of V is for improvement of strength, or for suppression of a chromium depletion zone, namely for stabilization by precipitating solid solution N as V nitride as much as possible so as to suppress precipitation of Cr as a nitride as in the above cases of Ti and Nb, and V is usually added at a level for precipitating out V nitride. In contrast, the present invention is based on the finding that nitride precipitation in a HAZ can be suppressed by limiting the addition of V at a solid solution level based on the following thought. The mechanism is as follows.

Cr nitride is precipitated when a HAZ is exposed to a nitride precipitation temperature range of approx. 500 to 900° C. for a short time of several seconds to several tens of seconds during cooling after heating by welding. Further, the affinity of V with N is not higher than Ti, Nb and the like, but higher than Cr, and V decreases the activity of N. Accordingly, addition of a trace amount of V can delay precipitation of Cr nitride and suppress the precipitation amount of Cr nitride during a time period as short as several tens of seconds.

However, if addition of a large amount of V is performed as a conventional method, the corrosion resistance is improved but the toughness decreases as in a conventional steel due to precipitation of a large amount of V nitride.

To cope with the above the inventors have found a method for delaying the precipitation of Cr nitride due to interaction, while limiting addition of V at a solid solution level. The mechanism therefor is supposed to be as follows.

As described above Cr nitride precipitates when a HAZ is exposed to a nitride precipitation temperature range of 500 to 900° C. for a time period as short as several seconds to several tens of seconds during cooling after heating in welding. Since V has high affinity with N and decreases the activity of N, addition of a trace amount of V delays precipitation of Cr nitride such that precipitation of Cr nitride can be inhibited during a time period as short as several tens of seconds.

However, to exert such effect of addition of V, V must be in a solid solution state. To this end, not only excessive addition of V must be suppressed, but also the amount of N in ferrite during cooling after welding should be reduced. To reduce the amount of N in ferrite to the extent possible during cooling after welding as much as possible, it is meaningless to suppress simply the addition amount of N, but an austenite phase, in which solid solution N is formed in a larger amount, is required to be fully secured.

In order to clarify conditions for securing an austenite phase, the present inventors tried to determine an equilibrium precipitation temperature by a simulation calculation, and to formulate the magnitude of contribution of each component. More specifically the following formula 3 for an estimated value of the equilibrium precipitation temperature for an austenite phase (γpre) was derived by computing the effect of an added element by an equilibrium calculation using thermodynamic data, and further by confirming the same through experiments. In the formula 3 each element name represents its content by mass-%.

$$\gamma pre=-15Cr-28Si-12Mo+19Ni+4Mn+19Cu+770N+1160C+1475 \quad \text{(Formula 3)}$$

Concerning an amount of N, the inventors defined directly the upper limit by an estimation formula for the amount of base material austenite and a relational expression with N in Patent Literature 6.

However, the situation is different for the case of high Cr, Mo steel as in the present invention. Since precipitation is delayed in the steel due to interaction of Cr and Mo with N, N does not precipitate during a short time period, even N exists in such an amount, as a nitride would eventually precipitate in a considerable amount, and as the result it has been found that, when NI value to be obtained from a relational expression of Cr, Mo and N, namely (Cr+Mo)/N, is selected in a proper range, the precipitation amount due to heating for short time by a welding heat input can be limited in a substantially problem-free range.

In order to define proper ranges for the afore-described V, γpre, and NI value, the present inventors conducted the following experiment simulating the heat cycle in a weld HAZ. Namely, samples of steel materials with various compositions were subjected to heat history of 1) heating up from room temperature to 1250° C. over 15 sec; 2) retaining at 1250° C. for 5 sec; 3) cooling isothermally from 1250° C. to 900° C. over 15 sec; 4) cooling isothermally from 900° C. to 400° C. over 135 sec; and 5) quenching from 400° C. to room temperature by nitrogen blowing, etc. in the order mentioned, namely as FIG. 1, and properties of the samples were evaluated.

The heat pattern simulates in a simplified manner a welding heat cycle generally used for a stainless steel. The maximum temperature region of 2) corresponds roughly to an increase region of a ferrite phase with a small solid solubility limit of nitrogen, the medium temperature region of 3) to a transformation region of a part of ferrite phase to an austenite phase, and the low temperature region of 4) to a precipitation region of a nitride, respectively. The respective transit time periods were determined based on actually measured temperature data. In other words, precipitation conditions for a nitride during actual welding can be simulated by the heat pattern.

By this evaluation method, the proper ranges of components, in which decrease in corrosion resistance due to precipitation of a nitride in a HAZ can be suppressed, were made clear.

First, it was found that there was a functional relationship between an austenite amount in a HAZ and γpre of the formula 3. The proper area ratio of the austenite amount in a HAZ was 40 to 70% from viewpoints of corrosion resistance, stress corrosion cracking resistance, toughness, etc., and the proper range of γpre was determined by calculation back based thereon.

Next, a duplex stainless steel could be obtained, which could effectively suppress precipitation of Cr nitride by setting the addition amount of V from 0.05% to 0.25%.

Further, as a range where precipitation of Cr nitride is suppressed and corrosion resistance can be maintained, a proper range was found to be defined by a relationship of an austenite phase precipitation temperature and an NI value as depicted in FIG. 2.

From the above results, a lean duplex stainless steel, for which the above control factors can be optimized and the problems can be solved, has been invented.

From the above findings, the essentials of the present invention are as follows:

(1) A duplex stainless steel superior in corrosion resistance of a weld characterized in that the duplex stainless steel comprises by mass-%:
C: 0.06% or less,
Si: 0.1 to 1.5%,
Mn: 2.0 to 4.0%,
P: 0.05% or less,
S: 0.005% or less,
Cr: 23.0 to 27.0%,
Ni: 2.0 to 6.0%,
Mo: 0.5 to 2.5%,
Cu: 0.5 to 3.0%,
V: 0.05 to 0.25%,
Al: 0.003 to 0.045%,
O: 0.007% or less, and
N: 0.20 to 0.28%;
and comprises further one, or two or more, selected out of:
Ca: 0.0005 to 0.0050%,
Mg: 0.0005 to 0.0050%, and
REM: 0.005 to 0.050%;
and the rest comprises Fe and an unavoidable impurity;
wherein the area ratio of an austenite phase is 40 to 70%;
the PI value according to the following formula 1 is 30 to 38;
the NI value according to the following formula 2 is 100 to 140; and
the estimated value of the equilibrium precipitation temperature for an austenite phase (γpre) according to the following formula 3 is 1350 to 1450;

$$PI = Cr + 3.3Mo + 16N \quad \text{(Formula 1)}$$

$$NI = (Cr + Mo)/N \quad \text{(Formula 2)}$$

$$\gamma pre = -15Cr - 28Si - 12Mo + 19Ni + 4Mn + 19Cu + 770N + 1160C + 1475 \quad \text{(Formula 3)}$$

wherein in the formulas each element name represents the content thereof by mass-%.

(2) The duplex stainless steel superior in corrosion resistance of a weld according to (1) above characterized in that the duplex stainless steel comprises further by mass-%:
Nb: 0.02 to 0.08%
and the value of the following Formula 4 is 0.003 to 0.015

$$Nb \times N \quad \text{(Formula 4)}$$

wherein in the formula each element name represents the content thereof by mass-%.

(3) The duplex stainless steel superior in corrosion resistance of a weld according to (1) or (2) above characterized in that the duplex stainless steel comprises further by mass-%:
Co: 0.02 to 1.00%.

(4) The duplex stainless steel superior in corrosion resistance of a weld according to any of (1) to (3) above characterized in that the duplex stainless steel comprises further by mass-%:
B: 0.0040% or less.

(5) The duplex stainless steel superior in corrosion resistance of a weld according to any of (1) to (4) above characterized in that the duplex stainless steel comprises further by mass-% one, or two or more, selected from:
Ti: 0.05% or less,
Zr: 0.02% or less,
Ta: 0.07% or less,
W: 1.0% or less, and
Sn: 0.1% or less.

(6) The duplex stainless steel superior in corrosion resistance of a weld according to any of (1) to (5) above characterized in that the chromium nitride precipitation temperature (TN), which is the upper limit temperature allowing a nitride to begin precipitation in equilibrium, is 1000° C. or less.

Advantageous Effects of Invention

According to an embodiment (1) above of the present invention, a duplex stainless steel, having corrosion resistance equivalent to a standard type of duplex stainless steel such as SUS329J3L, and having mitigated a drawback in using as a structural material by suppressing decrease in corrosion resistance in a weld heat-affected zone, which is one of the major drawbacks of a duplex stainless steel containing a large amount of N to reduce as much a possible the use of a high cost alloy such as Mi and Mo, can be provided. As the result the use of the same can be expanded by replacing an austenite stainless steel at a low cost, which contributes tremendously to industries.

According to an embodiment (2) above of the present invention, the decrease in corrosion resistance in a weld heat-affected zone due to nitride precipitation can be further suppressed by addition of a trace amount of Nb.

According to an embodiment (3) above of the present invention, the corrosion resistance and toughness of the base material can be further improved, while suppressing the decrease in corrosion resistance in a weld heat-affected zone of the steel.

According to an embodiment (4) above of the present invention, the hot workability can be improved, while suppressing the decrease in corrosion resistance in a weld heat-affected zone of the steel.

According to an embodiment (5) above of the present invention, the corrosion resistance can be improved, while suppressing the decrease in corrosion resistance in a weld heat-affected zone and decrease in toughness of the steel.

According to an embodiment (6) above of the present invention, decrease in corrosion resistance can be further suppressed.

DESCRIPTION OF EMBODIMENTS

Figure 1:
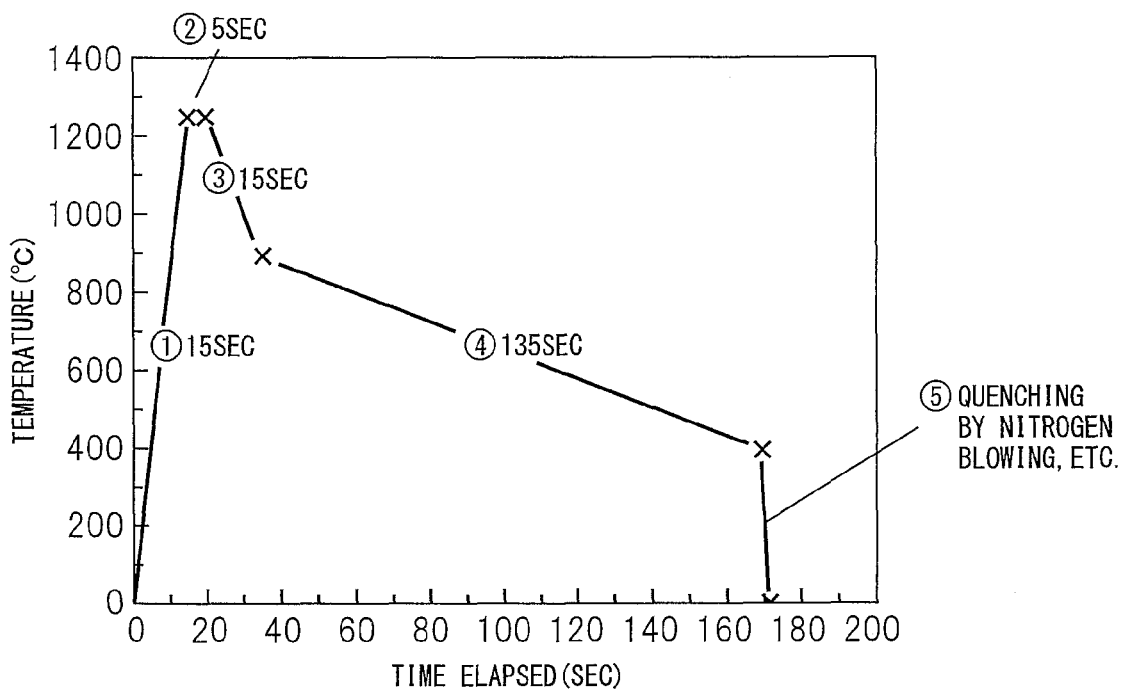
FIG. 1 is a graph illustrating the heat history of a thermal treatment simulating a welding heat cycle.

The present invention will be described in detail below.

First, the reasons behind the limitation in the embodiment (1) of the present invention will be described. In this regard, % related to a component means mass-%.

The content of C is limited to 0.06% or less in order to secure the corrosion resistance of a stainless steel. If the content exceeds 0.06%, Cr carbide is formed to deteriorate the corrosion resistance. It is preferably 0.04% or less. While, if the content is extremely reduced, the cost increases greatly, and therefore its lower limit is preferably 0.001%.

Si is added for deoxidation at 0.1% or more. If added, however, more than 1.5%, the toughness is deteriorated. Therefore the upper limit is restricted to 1.5%. The preferable range is 0.2 to 1.0%.

Since Mn increases an austenite phase in a duplex stainless steel and suppresses formation of strain-induced martensite to improve the toughness, and further increases solid solubility for nitrogen to suppress precipitation of a nitride at a weld, it is added in an amount of 2.0% or more. If added, however, more than 4.0%, the corrosion resistance is deteriorated. Therefore the upper limit is restricted to 4.0%. The preferable range is more than 2.0% and less than 3.0%.

Since P, which is an element unavoidably contained in a steel, deteriorates hot workability, its content is restricted to 0.05% or less. Preferably, it is 0.03% or less. On the other hand, if the content is reduced too far, the cost is increased too much, and therefore a preferable lower limit is 0.005%.

Since S, which is an element unavoidably contained in a steel similarly as P, deteriorates hot workability, toughness and also corrosion resistance, its content is restricted to 0.005% or less. Preferably, it is 0.002% or less. On the other hand, if the content is reduced too far, the cost is increased too much, and therefore a preferable lower limit is 0.0001%.

Cr is an element required fundamentally for securing corrosion resistance, and is one of three elements to increase the PI value according to the following Formula 1. Since it is a relatively low cost alloy, its content according to the present invention is 23.0% or more. On the other hand, it is an element to increase a ferrite phase, and if its content exceeds 27.0%, the ferrite amount becomes excessive in a composition system according to the present invention, and the corrosion resistance and toughness are impaired. Therefore the content of Cr is decided between 23.0% and 27.0%. The preferable range is more than 24.0% and less than 26.0%.

$$PI = Cr + 3.3Mo + 16N \quad \text{(Formula 1)}$$

wherein each element name represents the content thereof by mass-%.

Ni is an element for increasing an austenite phase in a duplex stainless steel, and added at a content of 2.0% or more in a composition system according to the present invention for securing an austenite phase, also for improving toughness by suppressing formation of strain-induced martensite, and for securing corrosion resistance against various acids. On the other hand, since it is an expensive alloy, its content is reduced to the extent possible according to the present invention and is 6.0% or less. The preferable range is more than 3.0% and less than 5.5%.

Mo is one of three elements to increase the PI value, and a very effective element for enhancing greatly the corrosion resistance of a stainless steel. Its content is 0.5% or more for securing the PI value according to the present invention. On the other hand, since it is a very expensive element, its content is restrained to the extent possible according to the present invention and the upper limit was defined as 2.5% or less. The preferable range is more than 1.0% and less than 2.0%.

Cu is an element effective for increasing an austenite phase in a duplex stainless steel similarly as Ni, improving toughness by suppressing formation of strain-induced martensite, and for securing corrosion resistance against various acids. Further, since it is an alloy less expensive than Ni, it is added at a content of 0.5% or more according to the present invention. On the other hand, if its content exceeds 3.0%, hot workability is impaired, and therefore the upper limit was defined at 3.0%. A preferable range is more than 0.6% and less than 2.0%, a more preferable range is more than 0.8% and less than 1.5%, and an especially preferable range is more than 1.0% and less than 1.5%

V is an important element to be added according to the present invention. Addition of 0.05% or more is necessary for decreasing the activity of N and delaying precipitation of a nitride. On the other hand, since addition exceeding 0.25% will decrease toughness at a HAZ by precipitation of V nitride, the upper limit was defined at 0.25%. The preferable range is 0.06% to 0.20%.

Al is an important element for deoxidation of a steel, and required to be contained at 0.003% or more for reducing oxygen in a steel. On the other hand, since Al is an element with relatively high affinity with N, excessive addition will impair the toughness of a base material by formation of AlN. Although its magnitude depends also on the N content, if Al exceeds 0.045%, the toughness decreases significantly. Therefore the upper limit of the content was defined at 0.045%%. The content is preferably 0.030% or less.

O is a harmful element constituting an oxide which is a representative non-metal inclusion, and excessive content impairs toughness. Further, if a coarse cluster oxide is formed, it may cause a surface defect. Therefore, the upper limit was defined at 0.007%. The content is preferably 0.005% or less. On the other hand, if the content is extremely reduced, the cost will be greatly increased, and therefore the lower limit is preferably defined at 0.0005%.

N is an element effective for enhancing strength and corrosion resistance by forming a solid solution in an austenite phase as well as increasing an austenite phase in a duplex stainless steel, and is especially important for increasing the PI value of an austenite phase. Therefore it is added to 0.20% or more. On the other hand, if the content exceeds 0.28%, it becomes practically impossible to make the NI value 100 or higher, the upper limit of the content was therefore defined at 0.28%. The preferable content is 0.22 to 0.26%.

Since a duplex steel according to the present invention becomes a high N and high austenite component system, the hot workability is inferior to a usual duplex stainless steel so that without any countermeasure edge cracking, etc., may take place in hot rolling. In this connection, any of Ca, Mg, and REM is an element to improve hot workability of a steel, and for this purpose one, or two or more thereof are added. On the other hand, excessive addition of any of them deteriorates the hot workability, and therefore the upper limit of the content is decided as follows. Namely, it is 0.0050% for Ca and Mg, and 0.050% for REM respectively. In this connection, REM stands for the total content of lanthanoid series rare earth elements, such as La and Ce. Since stable effect can be obtained with respect to Ca and Mg from 0.0005%, the preferable range is from 0.0005 to 0.0050%; and since stable effect can be obtained with respect to REM from 0.005%, the preferable range is from 0.005 to 0.050%.

In order to obtain good properties for a duplex steel according to the present invention, it is necessary to make the austenite phase area ratio in a range from 40 to 70%. If it is less than 40% insufficient toughness, and if it is beyond 70% drawbacks in the hot workability and stress corrosion cracking may appear. In both cases, the corrosion resistance becomes poor.

With respect to a steel according to the present invention, an austenite phase having a high solid solubility limit for nitrogen should better be increased as much as possible so as to suppress to the extent possible decrease in corrosion resistance and toughness by precipitation of a nitride. In the case the temperature condition for a solution heat treatment is set at a usual condition for a duplex steel of approx. 1050° C., securement of the austenite amount can be attained by regulating the ratio of an austenite phase increase element to a ferrite phase increase element within a prescribed range according to the present invention.

Next, the PI value expressed by the following Formula 1 is set between 30 and 38. The PI value is also described in Patent Literature 7, etc., and is a prevailing index indicating pitting corrosion resistance of a stainless steel. Since an object of the present invention is to provide a stainless steel having corrosion resistance equivalent to SUS329J3L, which is one of the most generally used duplex stainless steels, the lower limit is defined at 30 for securing a PI value equivalent to the steel. On the other hand, since a PI value of a composition system according to the present invention attainable, while securing (Cr+Mo)/N, is at the most 38, the upper limit is defined at 38.

$$PI = Cr + 3.3Mo + 16N \quad \text{(Formula 1)}$$

wherein each element name represents the content thereof by mass-%.

Next, the NI value expressed by the following Formula 2 is set between 100 and 140. The NI value is an index for degree of the delay in precipitation of chromium nitride in connection with a relationship among Cr, No and N. If the value is 100 or more, the precipitation can remain at a problem-free level with the heat pattern of FIG. 1 corresponding to a weld heat-affected zone with a welding heat input of 3.5 kJ/mm capable of submerged arc welding. On the other hand, if the value exceeds 140, N is relatively meager and a problem, such as decrease in a γ amount (austenite amount) and decrease in corrosion resistance in an austenite phase, occurs, and therefore the upper limit was defined at 140. The NI value is preferably from 100 to 125.

$$NI = (Cr+Mo)/N \quad \text{(Formula 2)}$$

wherein each element name represents the content thereof by mass-%.

Next, the estimated value of the equilibrium precipitation temperature for an austenite phase (γpre) according to the following Formula 3, which is an index for evaluating a driving force for precipitation of an austenite phase during cooling after welding, is set between 1350 and 1450. The larger the γpre is, the easier an austenite phase is formed.

The formula was derived by an equilibrium calculation using a thermodynamic calculation software "Thermo-Calc" (Registered trademark) by Thermo-Calc Software AB, and modified by experiments.

Although the γpre exceeds a melting point (which varies according to the composition and is between 1400 and 1500° C.) on the high temperature side, since the value is used in the present invention as an an index for evaluating a driving force on an austenite phase, the value is virtually extended.

As described above, decrease in corrosion resistance in a weld heat-affected zone is caused by formation of a chromium depletion zone at α grain boundaries through precipitation of $Cr_2N$ during cooling triggered by decrease in an austenite amount by welding heating. Therefore the decrease in corrosion resistance can be avoided by suppressing precipitation of $Cr_2N$ through combination of securement of a minimum value of γpre and the control of (Cr+Mo)/N.

The inventors carried out experiment according to the welding simulation in FIG. 1 and have confirmed that the weld austenite amount correspond to γpre of Formula 3 and and if the latter is 1350 or higher sufficient corrosion resistance can be obtained. Reversely, if the same exceeds 1450, an austenite phase becomes excessive and drawbacks in stress corrosion cracking or a hot workability may appear. The preferable range is from 1370 to 1430.

$$\gamma pre = -15Cr - 28Si - 12Mo + 19Ni + 4Mn + 19Cu + 770N + 1160C + 1475 \quad \text{(Formula 3)}$$

wherein each element name represents the content thereof by mass-%.

Next, the reasons behind the limitation in the embodiment (2) of the present invention will be described.

Nb is, as described above, an element effective for decreasing the activity of N and suppressing precipitation of a nitride, and added optionally. However care must be taken in the usage, because the affinity with N is relatively high and by addition of a small amount causes precipitation of Nb nitride. By addition thereof not exceeding the upper limit obtained by a relational expression with N for securing the addition amount not to exceed the solid solubility limit, the effect of V can be further reinforced. To obtain the effect, Nb is required to be added at 0.02% or more. However, if added excessively, Nb nitride precipitates to compromise the toughness including a base material, and therefore the content is required to be 0.08% or less.

Further, by adding Nb so as to make the value of the following Formula 4 for calculating a so-called solid solubility product from 0.003 to 0.015, the above effect can be obtained without negatively affecting the toughness.

$$Nb \times N \quad \text{(Formula 4)}$$

wherein each element name represents the content thereof by mass-%.

Next, the reasons behind the limitation in the embodiment (3) of the present invention will be described.

Co is an element effective for enhancing toughness and corrosion resistance in a steel, and added optionally. If the content is less than 0.02%, the effect is minimal, and if the content is beyond 1.00%, since it is an expensive element, the effect compatible with the cost increase cannot be exerted any more. Therefore, when it is added, the content is decided between 0.02 and 1.00%. From a viewpoint of cost, the preferable range is from 0.02 to below 0.30%.

Next, the reasons behind the limitation in the embodiment (4) of the present invention will be described.

B is an element for improving the hot workability of a steel, and added optionally. By adding preferably 0.0003% or more, the grain boundary strength can be increased stably and the hot workability can be improved. However, by excessive addition, the hot workability is even impaired by excessive precipitated boride, and therefore the upper limit is defined at 0.0040%.

Next, the reasons behind the limitation in the embodiment (5) of the present invention will be described.

By adding Ti, Zr and Ta, the negative influence of C and S on corrosion resistance can be suppressed, but by excessive addition thereof negative influence such as decrease in toughness appears. Therefore the contents on the occasion of optional addition are limited to Ti≤0.05%, Zr≤0.02%, and Ta≤0.07%.

W is an element optionally added for enhancing additionally the corrosion resistance of a duplex stainless steel, and, since it is an expensive element and excessive addition leads to cost increase, the content is restricted to 1.0% or less.

Sn is an optional element for improving additionally the acid resistance, and it can be added up to the upper limit of 0.1% from a viewpoint of the hot workability.

While, the contents of Ti, Zr, Ta, W, and Sn able to exert stably the effects are 0.001% or more, 0.003% or more, 0.01% or more, 0.05% or more, and 0.05% or more, respectively.

Next, the reasons behind the limitation in the embodiment (6) of the present invention will be described.

A chromium nitride precipitation temperature (TN), which is the upper limit temperature allowing a nitride to begin precipitation in equilibrium, is a characteristic value determined experimentally. A steel material having been subjected to a solution heat treatment is further subjected to a soaking treatment within 800 to 1100° C. for 20 min and then to water cooling for 5 sec, and the precipitated amount of chromium nitride in the steel material after cooling is measured according to the electrolytic extraction residue analysis method for a non-metal inclusion described in details in Example. TN is defined as the minimum temperature of soaking treatment temperatures, at which a Cr residue amount is 0.03% or less. The lower the TN is, to the lower temperature the temperature range in which chromium nitride precipitates is restricted, and the precipitation rate or the precipitation amount of chromium nitride is suppressed.

The soaking treatment temperature is defined as above between 800 and 1100° C., because the range is a prevailing temperature range at an HAZ during cooling after heating by welding. The present invention invokes the temperature range, so as not to precipitate chromium nitride during cooling after heating by welding generally practiced.

Further, the soaking treatment temperature is defined at 20 min as a time period in which chromium nitride reaches equilibrium adequately. If it is less than 20 min, it corresponds to a region, where fluctuation of precipitation amount is significant and reproducibility of measurements can be hardly obtained; and if it is beyond 20 min, a measurement requires a long time period. Therefore from a viewpoint of securing reproducibility by allowing adequate time to reach equilibrium of chromium nitride, the soaking treatment temperature may exceed 20 min.

If it takes a long time after a soaking treatment until water cooling, the temperature of a steel material decreases gradually and eventually chromium nitride precipitates resulting in a value of a chromium nitride amount different from that at an intended measuring temperature. Consequently, the steel material is to be subjected to water cooling within 5 sec after a soaking treatment.

Further, the reason why TN is defined as the minimum temperature among temperatures, at which a Cr residue amount is 0.03% or less, is that the residue amount of 0.03% or less is confirmed by experiments as a precipitation amount, which does not exert negative influence on corrosion resistance or toughness.

With respect to suppression of precipitation of chromium nitride at a weld as an object of the present invention, since rapid precipitation of a nitride can be suppressed as described above by regulating the NI value in a high Cr and Mo environment as according to the present invention, if the TN is designed to be 1000° C. or less, although not prerequisite, the reliability concerning the nitride precipitation property can be further improved. It is preferably 960° C. or less.

For decreasing the TN, it is effective to decrease the amount of N, however extreme decrease in the amount of N brings also decrease in the austenite phase ratio and the decrease in corrosion resistance of a weld. Therefore it is necessary to design appropriately the contents of Ni, Mn, and Cu, which are elements for forming an austenite phase, and the N content.

Further, although the TN decreases by decreasing the N content, a steel according to the present invention contains N at 0.20% or more for enhancing the corrosion resistance, and in this case the TN can be hardly lowered below 800° C. Consequently, the lower limit of TN was defined at 800° C.

A lean duplex stainless steel material according to the present invention can be produced by re-heating an ingot or a slab of a duplex stainless steel having any composition described above to 1100 to 1250° C., and hot-rolling at a finishing temperature of 700 to 1000° C., and by heat-treating the steel after hot rolling at a heat-treatment temperature of 900 to 1100° C. for a soaking time required for securing base material properties depending on the material thickness (e.g. for a 10 mm-thick material, 2 to 40 min), followed by cooling.

EXAMPLES

Examples will be described below. Chemical compositions of sample steels are shown in Table 1. Other components not described in Table 1 are Fe and unavoidable impurity elements. Further, PI value, NI value, γpre in Table 1 represent respectively:

$$PI = Cr + 3.3Mo + 16N \quad \text{(Formula 1)}$$

$$NI = (Cr + Mo)/N \quad \text{(Formula 2)}$$

$$\gamma pre = -15Cr - 28Si - 12Mo + 19Ni + 4Mn + 19Cu + 770N + 1160C + 1475 \quad \text{(Formula 3)}$$

In the above formulas each element name represents the content thereof by mass-%.

A chromium nitride precipitation temperature TN in the table is determined according to the following procedure:

(a) A 10 mm-thick steel specimen is treated under the following conditions for a solution heat treatment.
(b) A soaking treatment is conducted at a given temperature between 800 and 1100° C. for 20 min, then within 5 sec followed by water cooling.
(c) The surface layer of the cooled steel specimen is polished with a #500 abrasive.
(d) A sample 3 g is cut out and the matrix thereof is dissolved in a non-aqueous solution (3% maleic acid+1% tetramethylammonium chloride+the balance of methanol) by electrolysis (100 mV constant voltage).
(e) A residue (precipitate) is filtrated by a 0.2 μm-pore filter and the precipitate is extracted.
(f) The chemical composition of the residue is analyzed to determine the chromium content. The chromium content in the residue is used as an index for the precipitated amount of chromium nitride.
(g) The TN is determined, with changing the soaking treatment temperature in (b), by finding the minimum temperature among soaking treatment temperatures that give a chromium content of 0.03% or less in a residue.

A blank box means "no addition" or "impurity level". REM in the table means lanthanoid series rare earth elements and the content refers to the total content of the elements.

Steels with the components were molten in an MgO crucible in a 50 kg-laboratory vacuum induction furnace and cast to an approx. 100 mm-thick flat steel ingot. A material for hot rolling was fabricated from the main part of the steel ingot, heated at a temperature of 1180° C. for 1 to 2 h, and hot-rolled under a condition of a finishing temperature of 950 to 850° C. to obtain a 12 mm-thick X approx. 700 mm-long hot rolled steel plate. In this regard, spray cooling was carried out from the state immediately after the rolling where the steel material temperature was 800° C. or more to 200° C. or less. The final solution heat treatment was carried out under the conditions of soaking at 1050° C. for 20 min and following water cooling.

A welding experiment was carried out using as a material the thus produced steel slab. The test material was prepared to provide a single bevel groove with the bevel angle of 35°, and the root face of 1 mm, and a welding experiment was carried out by submerged arc welding. A welded joint was prepared using the 12 mm steel slab as a material and a commercial weld wire with the wire diameter of 4.0 mmφ made of a similar composition metal as JIS SUS329J3L under conditions of welding current: 520 to 570 A, arc voltage: 30 to 33 V, and welding speed: 30 to 33 cm/min.

Characteristic properties of the thus obtained steel slab and welded joint were evaluated as follows.

With respect to a hot workability, the length of the longest edge cracking in an approx. 700 mm rolled material was defined as the edge cracking length and rated as good if it is 10 mm or less.

With respect to an impact property of a base material, each 3 pieces of JIS Type 4 V-notched Charpy specimen were cut out perpendicularly to the rolling direction, wherein the notch was fabricated such that a rupture propagated in the rolling direction, impact values were measured on a testing machine with the rated maximum energy of 500 J at −20° C., and 150 J/cm² or more was rated as good.

With respect to an austenite phase area ratio, a ferrite phase area ratio was measured by polishing a cross section parallel to the rolling direction in an embedded state to a mirror surface, electrolytically etching the same in a KOH aqueous solution, and conducting image analysis by observation under a light microscope, and the balance was defined as an austenite phase area ratio.

Further to evaluate corrosion resistance, specimens taken from surface layers of a base material and a welded joint (including all of a base material, a HAZ, and a welding metal) were polished with a #600 abrasive, and a critical pitting temperature was measured by a ferric chloride immersion test according to ASTM G48 Method E. In the case of a base material 30° C. or more was rated good, and in the case of a welded joint 20° C. or more was rated good.

The evaluation results are shown in Table 2.

Steels according to the present invention exhibited good values in any of edge cracking of a rolled material, an impact property, CPT, and CPT at a weld HAZ of a base material.

With respect to a hot workability, when P, S, or Cu was excessive, the edge cracking of a hot-rolled plate exceeded 10 mm (Steel No. J, K, and Q).

Further, when Ca, Mg, and REM were not added (No. X), or reversely added excessively (No. Y, Z, and AA), a hot workability was deteriorated similarly.

Further, when B or Sn was added excessively (No. AD and AH), the result was same as above.

Further, when the austenite phase area ratio was too high (No. D and AJ), the edge cracking was beyond 10 mm. This is because γpre of No. D was too high.

With respect to the toughness of a base material, Steels No. G, K, S, W, AB, AE, AF, and AG containing excessively Si, S, Al, V, Nb, Ti, Zr, or Ta exhibited values below 200 J/cm² and were not acceptable. In the case of No. AC. the absolute value of Nb was small, but Nb×N was 0.017, which exceeded the range according to the present invention (Nb×N: 0.003 to 0.015), and the toughness was poor. In this regard, the Nb×N of Steel No. 4 according to the present invention is 0.013, and the Nb×N of Steel No. 13 according to the present invention is 0.014.

Reversely, also in the case of No. L containing too little Ni, the toughness was poor.

Further, for Steels No. F, and R containing too little Si, or Al, due to insufficient deoxidation, the O content became high and a large amount of inclusion caused poor toughness.

Further, for No. AI whose austenite amount was too small, the toughness was poor.

With respect to the corrosion resistance of a base material, Steels No. E, I, and K containing C, Mn, or S excessively, and Steels No. M, O, and T containing too little Cr, Mo, or N exhibited CPT less than 30° C. and were not acceptable.

Figure 2:
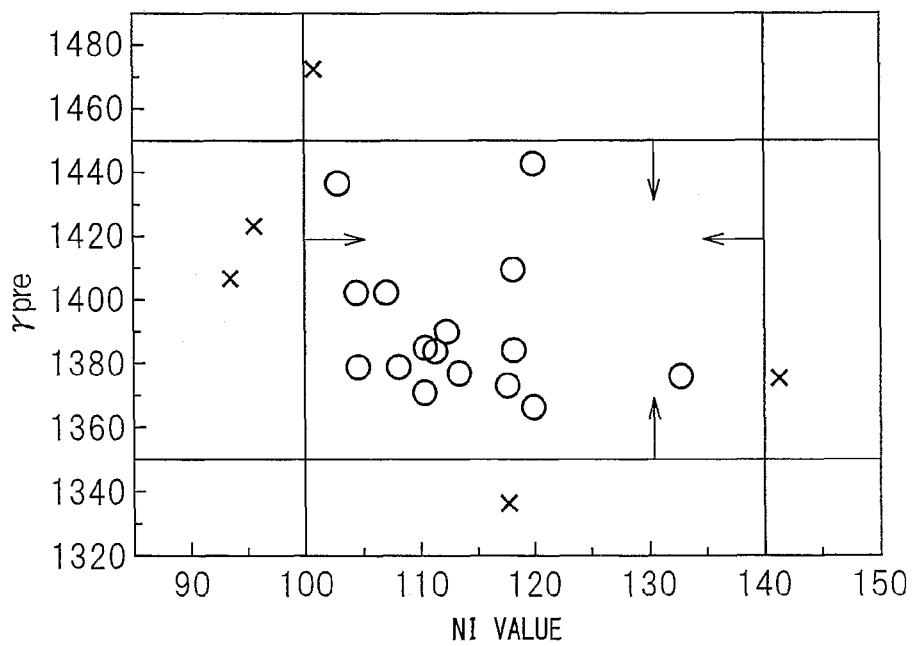
FIG. 2 is a graph illustrating a condition range for good corrosion resistance in a HAZ.

With respect to the corrosion resistance of a HAZ, when the NI value and the γpre are within the prescribed range as depicted in FIG. 2, the CPT was 20° C. or more to exhibit a good property. On the other hand, for Steels No. E, I, K, M, O, and T with poor base materials, No. A and B with off-specification NI values and No. C with too low γpre were not acceptable.

Further, No. V with too little addition amount of V was also not acceptable.

For No. H and L with too little Mn or Ni, and No. N and U with too much Cr or N, the corrosion resistance was compromised by precipitation of a nitride. It was identical for No. AI with a too small austenite amount. While, for No. P containing too little Cu, the acid resistance was significantly deteriorated compared to other materials.

As obvious from the above Examples, it has been made clear that a duplex stainless steel superior in the corrosion resistance of a weld can be obtained according to the present invention.

TABLE 1

| | Steel No. | C | Si | Mn | P | S | Ni | Cr | Mo | Cu | Al | N | Nb | V | Co | O | Ca | Mg |
|---|---|---|---|---|---|---|---|---|---|---|---|---|---|---|---|---|---|---|
| Example of the present invention | 1 | 0.022 | 0.31 | 2.84 | 0.016 | 0.0019 | 3.85 | 25.78 | 1.73 | 1.22 | 0.014 | 0.234 | | 0.091 | | 0.0055 | | 0.0048 |
| | 2 | 0.012 | 0.42 | 3.31 | 0.013 | 0.0014 | 2.82 | 24.82 | 1.70 | 1.54 | 0.029 | 0.259 | | 0.133 | | 0.0035 | 0.0014 | |
| | 3 | 0.026 | 0.46 | 2.12 | 0.023 | 0.0005 | 4.05 | 25.68 | 2.13 | 1.15 | 0.038 | 0.252 | | 0.085 | | 0.0011 | | |
| | 4 | 0.028 | 0.76 | 2.44 | 0.025 | 0.0042 | 3.55 | 24.47 | 1.94 | 1.23 | 0.026 | 0.233 | 0.056 | 0.188 | 0.40 | 0.0042 | 0.0014 | |
| | 5 | 0.019 | 0.26 | 2.76 | 0.005 | 0.0004 | 4.25 | 25.14 | 1.65 | 0.78 | 0.003 | 0.239 | | 0.074 | | 0.0035 | 0.0026 | |
| | 6 | 0.013 | 0.48 | 2.14 | 0.011 | 0.0012 | 3.49 | 24.03 | 1.61 | 1.74 | 0.011 | 0.231 | | 0.064 | | 0.0044 | | |
| | 7 | 0.004 | 0.64 | 2.92 | 0.015 | 0.0008 | 3.48 | 24.69 | 1.93 | 1.91 | 0.026 | 0.251 | | 0.235 | | 0.0006 | 0.0011 | 0.0013 |
| | 8 | 0.004 | 0.35 | 2.89 | 0.027 | 0.0018 | 3.14 | 23.77 | 1.77 | 1.25 | 0.028 | 0.235 | | 0.078 | 0.13 | 0.0019 | | |
| | 9 | 0.036 | 0.96 | 2.41 | 0.048 | 0.0005 | 3.33 | 24.96 | 0.58 | 1.81 | 0.020 | 0.216 | | 0.106 | | 0.0015 | | 0.0030 |
| | 10 | 0.039 | 0.56 | 4.00 | 0.026 | 0.0016 | 5.36 | 25.52 | 1.25 | 1.17 | 0.007 | 0.250 | | 0.125 | | 0.0052 | 0.0035 | |
| | 11 | 0.019 | 0.46 | 2.42 | 0.014 | 0.0026 | 3.17 | 24.79 | 1.81 | 1.75 | 0.040 | 0.222 | | 0.149 | | 0.0013 | | |
| | 12 | 0.023 | 0.59 | 2.28 | 0.020 | 0.0011 | 3.05 | 25.05 | 1.16 | 1.31 | 0.022 | 0.238 | | 0.196 | | 0.0019 | | 0.0035 |
| | 13 | 0.038 | 0.66 | 2.79 | 0.045 | 0.0006 | 3.95 | 25.44 | 1.78 | 1.78 | 0.027 | 0.205 | 0.068 | 0.160 | | 0.0008 | 0.0006 | 0.0006 |
| | 14 | 0.009 | 0.52 | 2.57 | 0.032 | 0.0014 | 5.23 | 25.65 | 1.19 | 1.84 | 0.016 | 0.234 | | 0.151 | | 0.0037 | 0.0013 | |
| | 15 | 0.026 | 0.35 | 2.31 | 0.013 | 0.0025 | 4.35 | 24.15 | 1.57 | 1.91 | 0.026 | 0.251 | | 0.110 | | 0.0025 | | 0.0037 |
| | 16 | 0.042 | 0.32 | 2.75 | 0.019 | 0.0016 | 4.72 | 24.48 | 1.06 | 2.22 | 0.026 | 0.213 | | 0.084 | | 0.0044 | | 0.0018 |
| | 17 | 0.019 | 0.43 | 2.33 | 0.007 | 0.0006 | 4.16 | 25.09 | 1.57 | 2.74 | 0.025 | 0.251 | | 0.110 | 0.05 | 0.0044 | 0.0028 | |
| | 18 | 0.018 | 0.33 | 2.14 | 0.028 | 0.0017 | 3.70 | 24.83 | 1.54 | 1.13 | 0.030 | 0.251 | 0.037 | 0.229 | 0.25 | 0.0048 | | 0.0022 |
| | 19 | 0.030 | 0.80 | 2.48 | 0.024 | 0.0008 | 3.51 | 23.88 | 1.38 | 1.17 | 0.011 | 0.240 | 0.055 | 0.064 | | 0.0037 | 0.0022 | |
| | 20 | 0.003 | 0.34 | 2.17 | 0.026 | 0.0004 | 3.54 | 25.26 | 1.64 | 1.63 | 0.005 | 0.233 | 0.064 | 0.092 | | 0.0011 | | 0.0027 |
| | 21 | 0.038 | 0.31 | 3.30 | 0.038 | 0.0017 | 4.01 | 25.75 | 1.15 | 1.76 | 0.024 | 0.231 | | 0.109 | 0.19 | 0.0033 | 0.0018 | |
| Comparative Example | A | 0.040 | 0.41 | 2.83 | 0.025 | 0.0035 | 4.51 | 26.51 | 2.45 | 1.96 | 0.015 | 0.205 | | 0.158 | | 0.0008 | | |
| | B | 0.037 | 0.94 | 2.72 | 0.030 | 0.0003 | 3.23 | 23.33 | 1.02 | 1.30 | 0.013 | 0.255 | | 0.103 | | 0.0018 | | |
| | C | 0.011 | 0.92 | 2.3 | 0.015 | 0.0008 | 2.76 | 24.61 | 1.52 | 1.50 | 0.028 | 0.222 | | 0.074 | | 0.0037 | | |
| | D | 0.048 | 0.53 | 2.54 | 0.038 | 0.0015 | 5.21 | 25.41 | 1.56 | 2.13 | 0.009 | 0.252 | | 0.142 | | 0.0028 | 0.0040 | |
| | E | 0.066 | 0.78 | 2.48 | 0.019 | 0.0048 | 3.21 | 24.96 | 0.50 | 1.22 | 0.020 | 0.253 | | 0.082 | | 0.0042 | | |
| | F | 0.019 | 0.07 | 2.01 | 0.011 | 0.0017 | 3.05 | 25.70 | 1.16 | 1.51 | 0.008 | 0.244 | | 0.130 | | 0.0085 | | 0.0034 |
| | G | 0.008 | 1.86 | 3.21 | 0.014 | 0.0001 | 3.70 | 24.48 | 1.16 | 1.58 | 0.007 | 0.240 | 0.044 | 0.158 | | 0.0049 | 0.0046 | 0.0012 |
| | H | 0.022 | 1.31 | 1.78 | 0.019 | 0.0007 | 4.20 | 23.21 | 1.34 | 1.09 | 0.004 | 0.229 | | 0.063 | | 0.0025 | | 0.0010 |
| | I | 0.017 | 0.30 | 4.33 | 0.021 | 0.0002 | 3.98 | 25.56 | 2.11 | 1.77 | 0.023 | 0.272 | | 0.141 | | 0.0036 | | |
| | J | 0.039 | 0.83 | 2.72 | 0.069 | 0.0004 | 4.22 | 25.58 | 1.28 | 1.18 | 0.023 | 0.213 | | 0.113 | | 0.0047 | 0.0027 | |
| | K | 0.006 | 0.21 | 2.65 | 0.026 | 0.0077 | 3.74 | 24.40 | 1.27 | 1.10 | 0.013 | 0.231 | | 0.131 | 0.38 | 0.0009 | 0.0010 | |
| | L | 0.015 | 0.51 | 2.87 | 0.007 | 0.0010 | 1.68 | 23.52 | 1.48 | 1.88 | 0.028 | 0.244 | | 0.086 | | 0.0027 | | 0.0033 |
| | M | 0.013 | 0.53 | 2.24 | 0.028 | 0.0011 | 3.19 | 22.81 | 1.94 | 1.91 | 0.017 | 0.244 | | 0.103 | | 0.0027 | 0.0008 | |
| | N | 0.030 | 0.36 | 2.68 | 0.029 | 0.0015 | 3.88 | 27.54 | 1.07 | 2.01 | 0.042 | 0.237 | | 0.099 | | 0.0046 | | 0.0021 |
| | O | 0.033 | 1.00 | 2.40 | 0.013 | 0.0003 | 4.44 | 25.63 | 0.36 | 1.15 | 0.023 | 0.230 | | 0.131 | | 0.0062 | 0.0014 | |
| | P | 0.014 | 0.93 | 2.60 | 0.019 | 0.0002 | 3.98 | 23.64 | 1.50 | 0.35 | 0.014 | 0.236 | | 0.155 | | 0.0069 | 0.0033 | |
| | Q | 0.014 | 0.32 | 2.16 | 0.016 | 0.0012 | 3.85 | 25.14 | 0.74 | 3.21 | 0.021 | 0.256 | | 0.072 | | 0.0039 | | |
| | R | 0.025 | 0.35 | 2.94 | 0.021 | 0.0010 | 3.41 | 25.50 | 1.96 | 1.96 | 0.002 | 0.250 | | 0.121 | | 0.0092 | 0.0021 | |
| | S | 0.012 | 0.50 | 2.96 | 0.020 | 0.0005 | 3.06 | 24.77 | 0.98 | 1.43 | 0.048 | 0.223 | | 0.109 | | 0.0029 | | 0.0015 |
| | T | 0.038 | 0.38 | 2.78 | 0.009 | 0.0015 | 3.63 | 23.15 | 1.25 | 1.68 | 0.017 | 0.179 | | 0.200 | | 0.0029 | 0.0029 | |
| | U | 0.028 | 1.41 | 2.19 | 0.015 | 0.0020 | 4.30 | 25.76 | 1.77 | 1.45 | 0.009 | 0.295 | | 0.145 | | 0.0036 | 0.0034 | |
| | V | 0.004 | 0.90 | 2.67 | 0.021 | 0.0018 | 3.56 | 23.68 | 1.49 | 1.20 | 0.028 | 0.223 | | 0.033 | | 0.0023 | 0.0040 | |
| | W | 0.032 | 0.96 | 2.06 | 0.024 | 0.0008 | 3.00 | 24.07 | 2.29 | 2.80 | 0.013 | 0.212 | | 0.277 | | 0.0032 | | |
| | X | 0.020 | 0.55 | 2.05 | 0.029 | 0.0014 | 3.71 | 24.56 | 1.51 | 1.86 | 0.021 | 0.245 | | 0.140 | 0.28 | 0.0025 | | |
| | Y | 0.016 | 0.82 | 2.28 | 0.021 | 0.0008 | 3.34 | 25.11 | 1.28 | 1.47 | 0.010 | 0.249 | | 0.140 | | 0.0044 | 0.0071 | |
| | Z | 0.030 | 0.93 | 2.32 | 0.016 | 0.0016 | 3.11 | 23.77 | 1.29 | 1.12 | 0.008 | 0.249 | | 0.110 | | 0.0043 | | 0.0075 |
| | AA | 0.031 | 0.71 | 2.61 | 0.021 | 0.0002 | 4.90 | 25.46 | 1.02 | 1.64 | 0.008 | 0.251 | | 0.117 | | 0.0037 | 0.0021 | |
| | AB | 0.035 | 0.81 | 2.69 | 0.010 | 0.0011 | 3.95 | 25.53 | 1.85 | 1.99 | 0.009 | 0.237 | 0.101 | 0.141 | | 0.0040 | | 0.0013 |
| | AC | 0.005 | 0.69 | 2.78 | 0.041 | 0.0008 | 4.39 | 23.60 | 1.52 | 1.54 | 0.027 | 0.244 | 0.071 | 0.075 | | 0.0041 | 0.0029 | 0.0033 |
| | AD | 0.002 | 0.81 | 2.38 | 0.026 | 0.0019 | 4.16 | 23.98 | 1.99 | 1.15 | 0.012 | 0.222 | | 0.135 | | 0.0018 | 0.0034 | |
| | AE | 0.007 | 0.69 | 2.49 | 0.011 | 0.0008 | 3.55 | 25.55 | 1.73 | 1.27 | 0.031 | 0.271 | | 0.081 | | 0.0043 | | 0.0034 |
| | AF | 0.029 | 0.61 | 3.42 | 0.008 | 0.0017 | 3.51 | 23.12 | 1.88 | 1.59 | 0.024 | 0.241 | | 0.154 | 0.59 | 0.0021 | 0.0010 | |
| | AG | 0.028 | 0.84 | 2.77 | 0.011 | 0.0010 | 3.41 | 24.60 | 1.32 | 1.61 | 0.021 | 0.233 | | 0.072 | | 0.0017 | | 0.0010 |
| | AH | 0.025 | 0.45 | 2.03 | 0.011 | 0.0001 | 3.77 | 24.77 | 1.50 | 1.55 | 0.019 | 0.259 | | 0.124 | | 0.0007 | | |
| | AI | 0.007 | 0.40 | 2.15 | 0.026 | 0.0010 | 2.39 | 23.88 | 1.60 | 1.71 | 0.017 | 0.222 | | 0.104 | | 0.0023 | 0.0016 | 0.0024 |
| | AJ | 0.037 | 0.32 | 2.58 | 0.021 | 0.0012 | 4.35 | 24.72 | 1.24 | 1.98 | 0.015 | 0.253 | | 0.093 | | 0.0045 | | 0.0007 |

| | Steel No. | REM | B | Ti | Zr | Ta | W | Sn | PI value | NI value | γ pre | TN |
|---|---|---|---|---|---|---|---|---|---|---|---|---|
| Example of the present invention | 1 | | | | | | | | 35.2 | 117.5 | 1373 | 973 |
| | 2 | | | | | | | | 34.6 | 102.4 | 1380 | 988 |
| | 3 | 0.031 | | | | | | | 36.7 | 110.3 | 1384 | 1009 |
| | 4 | | | 0.0035 | | | | | 34.6 | 113.2 | 1376 | 997 |
| | 5 | | | | | 0.012 | | | 34.4 | 112.3 | 1383 | 965 |
| | 6 | 0.023 | | | | | | 0.06 | 33.1 | 111.0 | 1383 | 965 |
| | 7 | | | | | | | | 35.1 | 106.0 | 1375 | 990 |
| | 8 | 0.030 | | | | | | | 33.4 | 108.8 | 1368 | 971 |
| | 9 | | | 0.0022 | | | | | 30.3 | 118.1 | 1383 | 947 |
| | 10 | | | | | | | 0.68 | 33.6 | 106.9 | 1440 | 921 |
| | 11 | 0.049 | | | 0.019 | | | | 34.3 | 119.8 | 1365 | 976 |
| | 12 | | | | | | 0.050 | | 32.7 | 110.1 | 1371 | 982 |
| | 13 | | | 0.0026 | | | | | 34.6 | 132.8 | 1375 | 958 |
| | 14 | | | | | | | 0.04 | 33.3 | 114.6 | 1397 | 931 |
| | 15 | | | 0.0012 | | | | | 33.3 | 102.6 | 1436 | 941 |
| | 16 | 0.015 | | | | | | | 31.4 | 119.9 | 1442 | 883 |

TABLE 1-continued

| Steel No. | c1 | c2 | c3 | c4 | c5 | c6 | v1 | v2 | v3 | v4 |
|---|---|---|---|---|---|---|---|---|---|---|
| 17 | | | | | | | 34.3 | 106.2 | 1424 | 946 |
| 18 | 0.029 | | | | | | 33.9 | 105.1 | 1389 | 980 |
| 19 | | | | | | | 32.3 | 105.1 | 1396 | 976 |
| 20 | | | | | | | 34.4 | 115.6 | 1357 | 978 |
| 21 | | | | | | | 33.2 | 116.6 | 1411 | 925 |
| Comparative Example A | 0.025 | 0.0015 | | | | | 37.9 | 141.3 | 1375 | 967 |
| B | 0.040 | | 0.019 | | | | 30.8 | 95.5 | 1423 | 968 |
| C | 0.031 | | | | | | 33.2 | 117.7 | 1335 | 1004 |
| D | | | | | | | 34.6 | 107.0 | 1460 | 934 |
| E | 0.031 | | | | | | 30.7 | 100.6 | 1438 | 957 |
| F | | | 0.047 | | | | 33.4 | 110.0 | 1379 | 968 |
| G | | | | | | | 32.2 | 107.0 | 1354 | 1002 |
| H | | | | 0.015 | | | 31.3 | 107.2 | 1384 | 987 |
| I | 0.026 | | | | | | 36.9 | 101.9 | 1413 | 967 |
| J | | | | | | | 33.2 | 126.3 | 1376 | 960 |
| K | | 0.0021 | | | | | 32.3 | 111.0 | 1376 | 946 |
| L | | 0.0033 | | | | | 32.3 | 102.5 | 1375 | 984 |
| M | | | | | 0.45 | | 33.1 | 101.4 | 1404 | 972 |
| N | 0.009 | | | | | | 34.9 | 120.5 | 1380 | 959 |
| O | | | | | | | 30.5 | 112.9 | 1390 | 947 |
| P | | | 0.025 | | | 0.07 | 32.4 | 106.4 | 1367 | 991 |
| Q | 0.015 | | | | | | 31.7 | 101.1 | 1436 | 915 |
| R | | 0.0012 | | | | | 36.0 | 110.0 | 1395 | 979 |
| S | | | | | | | 31.6 | 115.5 | 1361 | 951 |
| T | | 0.0022 | | | | | 30.1 | 136.3 | 1396 | 894 |
| U | | | | | | | 36.3 | 93.3 | 1406 | 1052 |
| V | | | | | | | 32.2 | 112.8 | 1354 | 978 |
| W | 0.010 | | | | | | 35.0 | 124.3 | 1379 | 991 |
| X | | | | | | | 33.5 | 106.5 | 1399 | 971 |
| Y | | | | | | | 33.3 | 106.0 | 1371 | 997 |
| Z | | | | | | | 32.0 | 100.7 | 1392 | 993 |
| AA | 0.062 | | | | | | 32.9 | 105.5 | 1425 | 944 |
| AB | 0.013 | 0.0015 | | | | | 35.4 | 115.7 | 1394 | 982 |
| AC | | | | | | | 32.5 | 102.9 | 1401 | 952 |
| AD | 0.029 | 0.0052 | | | | | 34.1 | 117.0 | 1353 | 988 |
| AE | | | 0.058 | | | | 35.6 | 100.7 | 1370 | 1021 |
| AF | 0.040 | | 0.027 | | | | 33.2 | 103.6 | 1419 | 954 |
| AG | | | | | 0.085 | | 32.7 | 111.2 | 1385 | 971 |
| AH | 0.022 | | | | | 0.20 | 33.8 | 101.5 | 1411 | 978 |
| AI | | 0.0018 | | | | | 32.7 | 114.8 | 1352 | 979 |
| AJ | | | | | | | 32.9 | 102.6 | 1449 | 927 |

TABLE 2

| | [Base material] | | | | [Welded joint] | | |
|---|---|---|---|---|---|---|---|
| Steel No. | Edge cracking (mm) | Austenite phase area ratio (%) | Impact value $vE_{-20}$ (J/cm$^2$) | CPT (°C.) | Austenite phase area ratio (%) | CPT (%) | Remarks |
| 1 | 7 | 42 | 333 | 40 | 46 | 30 | Example of the present invention |
| 2 | 5 | 42 | 312 | 40 | 49 | 25 | Example of the present invention |
| 3 | 3 | 43 | 337 | 45 | 50 | 30 | Example of the present invention |
| 4 | 1 | 50 | 319 | 40 | 40 | 20 | Example of the present invention |
| 5 | 3 | 49 | 377 | 40 | 50 | 25 | Example of the present invention |
| 6 | 4 | 58 | 320 | 40 | 49 | 30 | Example of the present invention |
| 7 | 5 | 46 | 373 | 45 | 43 | 25 | Example of the present invention |
| 8 | 3 | 50 | 273 | 35 | 42 | 20 | Example of the present invention |
| 9 | 2 | 58 | 346 | 30 | 44 | 20 | Example of the present invention |
| 10 | 8 | 62 | 588 | 35 | 63 | 30 | Example of the present invention |
| 11 | 5 | 41 | 298 | 35 | 45 | 20 | Example of the present invention |
| 12 | 4 | 40 | 233 | 40 | 40 | 20 | Example of the present invention |
| 13 | 3 | 41 | 418 | 40 | 48 | 25 | Example of the present invention |

TABLE 2-continued

| | [Base material] | | | [Welded joint] | | |
|---|---|---|---|---|---|---|
| Steel No. | Edge cracking (mm) | Austenite phase area ratio (%) | Impact value vE$_{-20}$ (J/cm$^2$) | CPT (° C.) | Austenite phase area ratio (%) | CPT (%) | Remarks |
| 14 | 6 | 61 | 534 | 40 | 55 | 30 | Example of the present invention |
| 15 | 2 | 84 | 417 | 40 | 66 | 25 | Example of the present invention |
| 16 | 8 | 67 | 522 | 35 | 63 | 25 | Example of the present invention |
| 17 | 3 | 63 | 498 | 40 | 56 | 25 | Example of the present invention |
| 18 | 7 | 49 | 270 | 45 | 47 | 25 | Example of the present invention |
| 19 | 5 | 59 | 278 | 40 | 49 | 25 | Example of the present invention |
| 20 | 6 | 43 | 314 | 45 | 37 | 25 | Example of the present invention |
| 21 | 4 | 51 | 450 | 35 | 51 | 30 | Example of the present invention |
| A | 2 | 40 | 471 | 35 | 35 | 15 | Comparative Example |
| B | 7 | 67 | 274 | 30 | 62 | 15 | Comparative Example |
| C | 6 | 40 | 220 | 35 | 37 | 15 | Comparative Example |
| D | 15 | 73 | 568 | 35 | 69 | 25 | Comparative Example |
| E | 6 | 57 | 262 | 25 | 64 | 10 | Comparative Example |
| F | 5 | 46 | 138 | 40 | 45 | 25 | Comparative Example |
| G | 7 | 50 | 121 | 30 | 36 | 20 | Comparative Example |
| H | 4 | 61 | 332 | 30 | 50 | 5 | Comparative Example |
| I | 6 | 49 | 510 | 25 | 60 | 10 | Comparative Example |
| J | 18 | 48 | 380 | 40 | 42 | 30 | Comparative Example |
| K | 28 | 52 | 144 | 25 | 41 | 15 | Comparative Example |
| L | 2 | 37 | 123 | 35 | 48 | 15 | Comparative Example |
| M | 8 | 64 | 299 | 25 | 53 | 10 | Comparative Example |
| N | 6 | 41 | 407 | 35 | 50 | 15 | Comparative Example |
| O | 6 | 53 | 402 | 25 | 48 | 10 | Comparative Example |
| P | 8 | 53 | 299 | 35 | 42 | 20 | Comparative Example (Acid resistance compromised) |
| Q | 22 | 70 | 457 | 40 | 62 | 35 | (Acid resistance compromised) |
| R | 2 | 48 | 113 | 40 | 49 | 20 | (Acid resistance compromised) |
| S | 4 | 43 | 144 | 35 | 44 | 20 | (Acid resistance compromised) |
| T | 1 | 60 | 343 | 25 | 50 | 15 | (Acid resistance compromised) |
| U | 4 | 59 | 409 | 45 | 39 | 15 | (Acid resistance compromised) |
| V | 9 | 48 | 317 | 40 | 41 | 15 | (Acid resistance compromised) |
| W | 7 | 51 | 328 | 45 | 39 | 15 | (Acid resistance compromised) |
| X | 17 | 51 | 185 | 35 | 53 | 20 | (Acid resistance compromised) |
| Y | 18 | 45 | 315 | 35 | 41 | 20 | (Acid resistance compromised) |
| Z | 22 | 55 | 217 | 40 | 49 | 20 | (Acid resistance compromised) |
| AA | 20 | 64 | 492 | 35 | 59 | 20 | (Acid resistance compromised) |
| AB | 2 | 45 | 122 | 40 | 47 | 20 | (Acid resistance compromised) |
| AC | 7 | 67 | 138 | 35 | 49 | 20 | (Acid resistance compromised) |
| AD | 18 | 52 | 379 | 40 | 33 | 20 | (Acid resistance compromised) |
| AE | 5 | 49 | 104 | 45 | 40 | 20 | (Acid resistance compromised) |
| AF | 6 | 62 | 131 | 40 | 62 | 25 | (Acid resistance compromised) |
| AG | 8 | 52 | 139 | 35 | 46 | 20 | (Acid resistance compromised) |
| AH | 17 | 56 | 315 | 45 | 59 | 30 | (Acid resistance compromised) |
| AI | 2 | 37 | 140 | 35 | 42 | 15 | (Acid resistance compromised) |

TABLE 2-continued

| Steel No. | [Base material] | | | | [Welded joint] | | Remarks |
|---|---|---|---|---|---|---|---|
| | Edge cracking (mm) | Austenite phase area ratio (%) | Impact value $vE_{-20}$ (J/cm$^2$) | CPT (° C.) | Austenite phase area ratio (%) | CPT (%) | |
| AJ | 19 | 72 | 432 | 35 | 62 | 20 | (Acid resistance compromised) |

INDUSTRIAL APPLICABILITY

According to the present invention, a duplex stainless steel, having corrosion resistance equivalent to a standard type of duplex stainless steel such as SUS329J3L, and being able to mitigate a drawback in using as a structural material by suppressing decrease in corrosion resistance in a weld heat-affected zone, which is one of the major drawbacks of a duplex stainless steel containing a large amount of N to reduce as much a possible the use of a high cost alloy such as Mi and Mo, can be provided. As the result the use of the same can be expanded by replacing an austenite stainless steel at a low cost, which contributes tremendously to industries.

The invention claimed is:

1. A duplex stainless steel superior in corrosion resistance of a weld characterized in that the duplex stainless steel comprises by mass-%:
 C: 0.06% or less,
 Si: 0.1 to 1.5%,
 Mn: 2.0 to 4.0%,
 P: 0.05% or less,
 S: 0.005% or less,
 Cr: 23.0 to 27.0%,
 Ni: 2.0 to 6.0%,
 Mo: 0.5 to 2.5%,
 Cu: 0.5 to 3.0%,
 V: 0.05 to 0.25%,
 Al: 0.003 to 0.045%,
 O: 0.007% or less, and
 N: 0.20 to 0.28%;
 and comprises further one, or two or more, selected from:
 Ca: 0.0005 to 0.0050%,
 Mg: 0.0005 to 0.0050%, and
 REM: 0.005 to 0.050%;
 and the rest comprises Fe and an unavoidable impurity;
 wherein the area ratio of an austenite phase is 40 to 70%;
 the PI value according to the following formula 1 is 30 to 38;
 the NI value according to the following formula 2 is 100 to 140; and
 the estimated value of the equilibrium precipitation temperature for an austenite phase (γpre) according to the following formula 3 is 1350 to 1450;

$$PI = Cr + 3.3Mo + 16N \quad \text{(Formula 1)}$$

$$NI = (Cr + Mo)/N \quad \text{(Formula 2)}$$

$$\gamma pre = -15Cr - 28Si - 12Mo + 19Ni + 4Mn + 19Cu + 770N + 1160C + 1475 \quad \text{(Formula 3)}$$

wherein in the formulas each element name represents the content thereof by mass-%.

2. The duplex stainless steel superior in corrosion resistance of a weld according to claim 1 characterized in that the duplex stainless steel comprises further by mass-%:
 Nb: 0.02 to 0.08%
 and the value of the following Formula 4 is 0.003 to 0.015

$$Nb \times N \quad \text{(Formula 4)}$$

wherein in the formula each element name represents the content thereof by mass-%.

3. The duplex stainless steel superior in corrosion resistance of a weld according to claim 1 or 2 characterized in that the duplex stainless steel comprises further by mass-%:
 Co: 0.02 to 1.00%.

4. The duplex stainless steel superior in corrosion resistance of a weld according to any one of claims 1 to 3 characterized in that the duplex stainless steel comprises further by mass-%:
 B: 0.0040% or less.

5. The duplex stainless steel superior in corrosion resistance of a weld according to any one of claims 1 to 4 characterized in that the duplex stainless steel comprises further by mass-% one, or two or more, selected from:
 Ti: 0.05% or less,
 Zr: 0.02% or less,
 Ta: 0.07% or less,
 W: 1.0% or less, and
 Sn: 0.1% or less.

6. The duplex stainless steel superior in corrosion resistance of a weld according to any one of claims 1 to 5 characterized in that the chromium nitride precipitation temperature (TN), which is the upper limit temperature allowing a nitride to begin precipitation in equilibrium, is 1000° C. or less.

* * * * *